United States Patent

Kamai

[11] 3,973,995
[45] Aug. 10, 1976

[54] LEAK PROOF DRY CELL

[76] Inventor: Toshiso Kamai, 30-10 Gohongi I-chome, Meguro, Tokyo, Japan

[22] Filed: Sept. 28, 1971

[21] Appl. No.: 184,370

[30] Foreign Application Priority Data
Sept. 29, 1970 Japan............................... 45-84625

[52] U.S. Cl................................ 136/107; 136/133
[51] Int. Cl.²....................... H01M 2/04; H01M 2/08
[58] Field of Search............................ 136/107, 133

[56] References Cited
UNITED STATES PATENTS

| | | | |
|---|---|---|---|
| 917,272 | 4/1909 | Enochs ................................ | 136/107 |
| 2,708,685 | 5/1955 | Coleman.............................. | 136/133 |
| 2,923,757 | 2/1960 | Klopp ................................. | 136/133 |
| 3,090,824 | 5/1963 | Reilly et al.......................... | 136/107 |
| 3,278,340 | 10/1966 | Bell..................................... | 136/107 |
| 3,433,681 | 3/1969 | Jammet............................... | 136/133 |
| 3,463,669 | 8/1969 | Jammet............................... | 136/107 |

Primary Examiner—Donald L. Walton
Attorney, Agent, or Firm—Eliot S. Gerber

[57] ABSTRACT

A dry cell consists of a metal cylindrical rigid container, an insulative sleeve of synthetic plastic resin, a sleeve of a zinc electrode, a separator sleeve and an internal cake consisting of a depolarizer and an electrolyte. The cake extends upward beyond the edge of the anode and the separator, at its top, contacts the plastic sleeve.

2 Claims, 2 Drawing Figures

LEAK PROOF DRY CELL

BACKGROUND OF THE INVENTION

This invention relates to a dry cell of the kind having a zinc electrode in the form of a sleeve or canister.

Known dry cells of the Leclanche kind have the disadvantage that leakage of electrolyte tends to occur for the following reason: With a known Leclanche dry cell having a cylindrical zinc canister as the anode and an electrolyte which consists mainly of ammonium chloride, the zinc of the anode, upon battery discharge, decomposes and zinc chloride is deposited on the side wall of the zinc canister and in its vicinity. At the same time fine zinc di-ammonium chloride crystals form which slowly develop to a semi-transparent layer on the surface of the zinc. This semi-transparent layer produces, due to the difference of density between the anode side of the zinc chloride and the cathode side, an osmotic pressure and allows liquid to pass from the electrolyte to the zinc anode wall.

The positive ions, such as zinc ions and zinc ammonium ions, due to the action of the electro-osmotic pressure, are attracted to the zinc anode. The zinc of the anode is decomposed by the discharge and becomes thinner. The zinc produces, due to its decomposition, a thick zinc chloride layer which dissolves the starch and fabric in the gummed paper which separates the anode and the electrolyte and the filterability of the electrolyte paste is promoted.

In the known Leclanche dry cell, for this reason, the liquid of the paste moves, due to osmotic pressure and the electro-osmotic pressure, to the zinc anode and rises between the thinned zinc sheet and the gummed layer of the separator, the liquid of which has now become too concentrated, and deposits on the upper surface of the depolarizer. The manganese dioxide of the depolarizer loses, in the meantime, its oxidization effect and the remaining anode zinc produces hydrogen gas which drives the liquid electrolyte through the pores into the outer casing, thereby causing the leakage of the electrolyte.

The provision of a thick zinc canister and a thick solid seal for the outer casing cannot in themselves prevent leakage of the electrolyte. In order to exclude the leakage of the electrolyte it is necessary to prevent completely the pressing out of the electrolyte onto the upper face of the cathode depolarizer.

SUMMARY OF THE INVENTION

According to the present invention, therefore, there is provided a dry cell of the kind having a protective outer casing, a zinc anode in the form of a sleeve or canister within the casing, a cake of a depolarizer and an electrolyte within the anode, and a separator between the anode and the cake, characterized in that the upper surface of the cake is above the upper extremity of the anode, and the separator extends above the upper surface of the said cake and is in close cooperation with the protective outer casing.

With this arrangement, because the separator extends above the anode and the cake, the attraction of the positive ions, such as zinc ions and ammonium ions, to the upper face of the cake, and therefore the depositing of electrolyte on the upper face of the cake, is prevented and the deterioration of the separator by the zinc chloride, which is produced with the decomposition of the zinc, is obviated.

Further, because the upper extremity of the anode is lower than the upper surface of the cake, the discharge reaction from the cake in its upper part takes place somewhat later than in the lower part. Thus, the semi-transparent layer of zinc di-ammonium chloride is not produced in the upper part of the cake and therefore the electrolyte which rises from the lower part is impeded by the closely contacting separator and outer casing. The electrolyte flows in the layer of the cake and is drawn into it so that escape of the electrolyte is prevented.

In order to prevent further the leakage of the electrolyte it is advantageous to prepare the electrolyte solution from zinc chloride and ammonium chloride such that the zinc chloride is the main substance. With this arrangement no zinc chloride occurs with the discharge, no fine crystals such as zinc diammino chloride form and thus there is little tendency for the electrolyte solution to be pressed upwards due to osmotic pressure.

Advantageously the amount of the anode zinc which contributes to the discharge is such that a useable voltage can be obtained until the depolarizer, which is preferably manganese dioxide, loses its oxidizing ability. However, if zinc still remains after the manganese dioxide has lost its oxidizing effect, it has the effect of producing hydrogen gas on the electrolyte side and thereby pressing electrolyte liquid into the outer casing. Preferably, therefore, the minimum amount of zinc in order to produce the current is provided. This reduces considerably the manufacturing cost of the cell.

The escape of any electrolyte via the surface of the cake would lead to the result that the substance producing the electricity is outside the reaction area and thus the output of the battery would be considerably reduced.

With the cell according to the invention, however, the electrolyte remains in the material producing electricity and therefore the cell has a higher discharge capacity.

With the cell according to the invention, the zinc preferably disappears in the last stage of the discharge process and in this case the zinc cannot maintain the shape of the cell. Therefore the cell is preferably provided with a metal covering as an outer container.

The present invention is applicable to dry cells having a paste construction whereby the separator contains starch and meal in the sticky state as well as to dry cells of the so-called paper lined construction in which gummed paper spread with meal or other adhesive material is used.

The anode zinc may be made in the form of a canister by means of an impact extrusion system and may be provided on the base with a zinc pin. This pin penetrates in a watertight manner through a hole on the base of the outer casing and has a rounded head which serves as the negative terminal.

It is also possible to form the anode as a cylinder from zinc sheet metal and to end a lengthened part of the sheet metal suitably on the base and make a anode conductor with a zinc pin which passes through the outer casing and the bent part of machine metal.

With the construction of the cell according to the present invention the electrolyte does not run out over the surface of the cake; therefore a larger space for the receiving of escaped liquid is superfluous in contradistinction to the known Leclanche cells. Thus, a larger depolarization cake can be used and the cell can be provided with more discharge capacity.

With the known cells there is, in addition, the drawback that the life of the discharged cell is short because its electrolyte, which escapes via the surface of the cake, produces at that surface a thick zinc chloride solution. This thick solution results in a so-called concentration cell for the less dense solution inside the cell, so that the cell carries out a self-discharge.

The cell according to the invention is free of such self-discharge which is caused by the concentrated cell. This also lengthens the life of the cell.

Preferably, the outer casing of a cell according to the invention is formed from a synthetic plastic resin material such as polyethylene, polypropylene or vinyl chloride.

BRIEF DESCRIPTION OF THE DRAWINGS

An embodiment of the invention will now be described by way of example only with reference to the accompanying drawings, in which.

DESCRIPTION OF THE PREFERRRED EMBODIMENT

Figure 1:
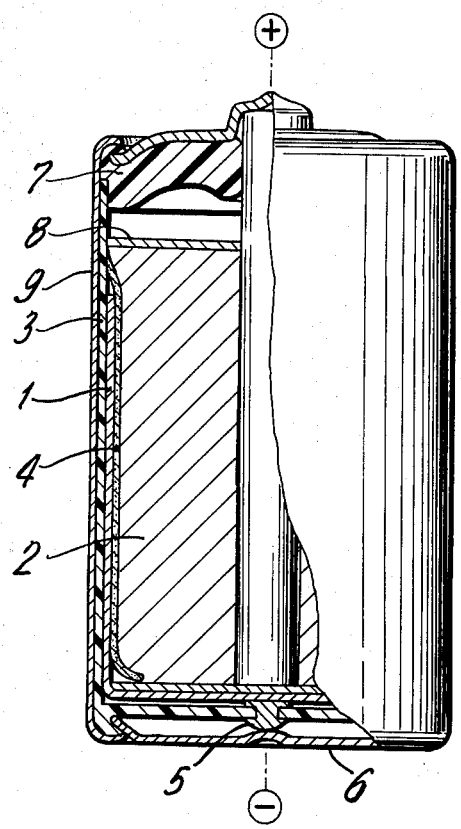
FIG. 1 is a vertical section through one form of Leclanche dry cell according to the invention.

The cell of FIG. 1 comprises a cylindrical plastic resin, preferably polyethylene, casing 3 containing a zinc canister 1. A cake 2 of electrolyte and depolarizer extends within the zinc canister to about 5 mm. above the upper edge of the canister 1. The electrolyte is an aqueous solution of ammonium chloride and zinc chloride and the depolarizer is manganese dioxide. The upper end of the casing 3 is closed with a sealing mass 7 of polyethylene by a heat sealing process. A metal pin 5 extends in a water-tight manner from the floor of the zinc canister 1 downwards through the floor of the synthetic resin casing 3. The tip of the metal pin 5 is electrically connected with a bottom disc 6 by means of electric spot welding.

Between the zinc canister 1 and the cake 2 there is disposed a separator 4 which consists of gummed paper on which starch, meal, etc., is spread. The gummed layer of the separator extends above the upper edge of the zinc canister and is in close watertight contact with the inner side of the synthetic material casing 3.

The separator 4 extends above the upper surface of the cake 2. A paper disc 8 is placed on the cake and protects the cake against pressure from above and below.

The casing 3 is provided with a metal covering 9 which ensures that the outer shape of the cell is maintained even after complete consumption of the zinc canister 1.

Figure 2:
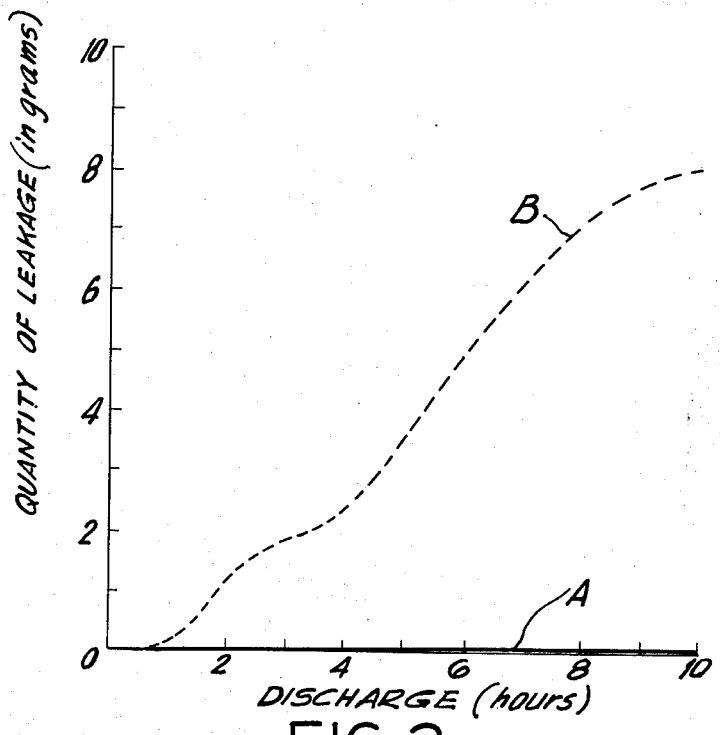
FIG. 2 is a graph showing the leakage curve of a dry cell according to the invention compared with that of a known Leclanche cell.

FIG. 2 shows the comparison of the quantities of leaked electrolyte in the short circuit condition in a dry cell according to the invention and in a conventional Leclanche dry battery UM 1. The abcissa axis represents the time of the short-circuiting discharge in hours, and the ordinate axis represents the quantity of the leaked electrolyte in grams. The curve A shows the amount of the leaked electrolyte in the cell according to the invention and the curve B shows it in the conventional Leclanche dry battery. At A substantially no leakage occurs until after 7 hours, while at B leakage occurs after 30 minutes and after 8 hours the amount of leaked liquid reaches 8 grams.

I claim:

1. A dry cell including a protective synthetic plastic resin casing having a tubular portion, a zinc anode in the form of a sleeve within the said casing, a cake depolarizer, an electrolyte, a separator in the form of a sleeve positioned between the zinc sleeve and the cake, an outer rigid container for maintaining the shape of the cell, said container having a base, an electrically conductive pin which makes electrical contact with the base of the said container, and a sealing mass which is sealed to said tubular portion and is positioned above said cake to form an air space between said cake and said sealing mass;

wherein the upper surface of the said zinc anode is below the upper extremity of the said cake, the separator extends above the upper surface of the said cake and is in direct water-tight connection with the tubular portion of the protective casing;

wherein the depolarizer comprises manganese dioxide and the electrolyte comprises ammonium chloride and zinc chloride, the zinc chloride being the main substance in the electrolyte; and wherein the amount of cathode zinc is such that it has substantially totally reacted when the capacity of the cells falls below its useful voltage.

2. A dry cell as in claim 1 wherein said plastic resin casing has a washer-shaped portion having a hole, said washer-shaped portion being connected to said tubular portion and wherein said conductive pin extends through said hole in said washer-shaped portion in a water-tight seal.

* * * * *